United States Patent [19]

Haldeman et al.

Best Available Copy

[11] E Re. 30,253

[45] Reissued Apr. 8, 1980

[54] TRANSPARENT INTERNAL COMBUSTION ENGINE

[75] Inventors: Charles W. Haldeman, Concord; Vahan V. Basmajian, Lexington, both of Mass.

[73] Assignee: Megatech Corporation, Billerica, Mass.

[21] Appl. No.: 857,367

[22] Filed: Dec. 5, 1977

Related U.S. Patent Documents

Reissue of:

[64] Patent No.: 3,698,370
Issued: Oct. 17, 1972
Appl. No.: 69,246
Filed: Sep. 3, 1970

U.S. Applications:

[63] Continuation of Ser. No. 407,228, Jan. 29, 1975, abandoned.

[51] Int. Cl.[2] ..... F02F 1/00

[52] U.S. Cl. ..... 123/193 CP; 123/193 C; 123/52 M; 123/1 R; 123/DIG. 3

[58] Field of Search ..... 277/160, 26; 123/DIG. 3, DIG. 12, 1 A, 1, 193, 52 M, 198 E; 92/155, 5 R, 193, 249; 13/35

[56] References Cited

U.S. PATENT DOCUMENTS

| | | | |
|---|---|---|---|
| 1,537,042 | 5/1925 | Brown | 123/DIG. 3 |
| 1,818,240 | 8/1931 | Morrell | 123/198 E |
| 2,407,717 | 9/1946 | Marschner | 123/1 A |
| 2,449,930 | 9/1948 | Davey | 92/155 |
| 2,496,623 | 3/1950 | Fragale | 123/DIG. 12 |
| 2,671,983 | 3/1954 | Roehrl | 123/DIG. 3 |
| 2,919,688 | 1/1960 | Bowditch et al. | 123/1 |
| 2,992,052 | 7/1961 | De John | 123/DIG. 3 |
| 3,341,209 | 9/1967 | Prasse et al. | 277/160 |
| 3,358,914 | 12/1967 | MacMillan | 92/155 |
| 3,612,545 | 10/1971 | Storms | 277/26 |
| 3,656,414 | 7/1972 | Muller | 92/193 |
| 3,659,502 | 5/1972 | Friedman et al. | 92/249 |
| 3,680,911 | 9/1971 | Prasse et al. | 277/58 |

FOREIGN PATENT DOCUMENTS 2428 of 1907 United Kingdom ..... 123/193 P

OTHER PUBLICATIONS

Traub; "Piston Ring Seals of Teflon TFE"; Journal of Teflon; Aug. 1965, pp. 4-7.

Rothrock; "Air Movement in Spark-Ignition Engines"; Journal of Aeronautical Sciences-vol. 6, No. 6; Apr. 1936; pp. 243-248.

Miller; "Role of Detonation Waves & Autoignition in Spark-Ignition Engine"; SAE Quarterly Transactions, vol. 1, No. 1, Jan. 1947; pp. 98-99.

*Primary Examiner*—Ronald H. Lazarus
*Assistant Examiner*—Craig R. Feinberg
*Attorney, Agent, or Firm*—Charles Hieken

[57] ABSTRACT

An operative internal combustion engine is transparent for demonstration of internal combustion engine principles. A transparent cylinder houses a noncontacting piston, a combustion chamber being sealed by means such as protruding annular teflon rings seated in an annular groove of the piston or a flexible flap formed integrally with the piston which is pressed firmly to the internal surface of the cylinder wall by pressure developed within the combustion chamber during operation of the engine. Other portions of the engine are transparent to enable their contained parts to be observed during operation. The engine also has an enlarged flywheel to permit operation of the engine at low, observable speeds. The invention burns low carbon fuels such as alcohol to keep the cylinder walls clean and operate without polluting the air.

23 Claims, 5 Drawing Figures

FIG. 4
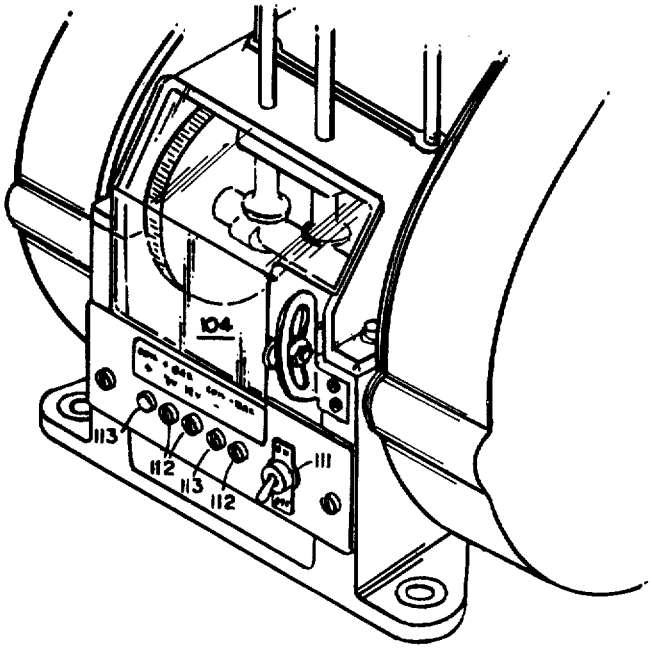
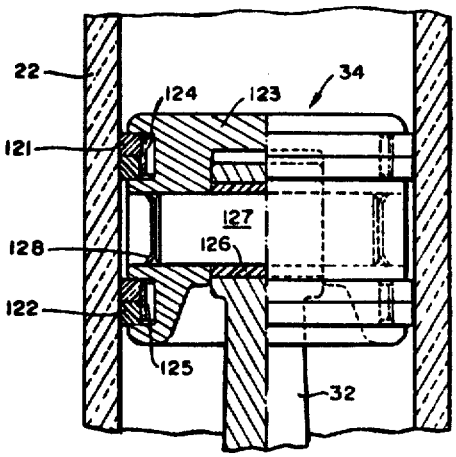
FIG. 5

TRANSPARENT INTERNAL COMBUSTION ENGINE

Matter enclosed in heavy brackets [ ] appears in the original patent but forms no part of this reissue specification; matter printed in italics indicates the additions made by reissue.

*This is a continuation of application Ser. No. 407,228 filed Jan. 29, 1975 now abandoned which is a reissue application of U.S. Pat. No. 3,698,370 filed 9/3/1970.*

BACKGROUND OF THE INVENTION

This invention relates in general to internal combustion engines and, more particular concerns transparent engines for educational use exposing the internal moving parts of the engine to view during operation. The invention is relatively easy and inexpensive to fabricate, safe, illustrates what happens during each cycle of engine operation and negligibly pollutes the air so that inside operation is safe and practical.

The wide use of internal combustion engines has resulted in extensive classroom study of their construction and operating principles. Internal combustion engines are employed frequently to demonstrate laws relating to the physical sciences and mechanics. Transparent models of such engines have been made to enable students to inspect visually the internal moving parts of the engine. In prior transparent engines, however, actual combustion does not take place because of the structural limitations which are necessary in order to provide the transparency characteristics.

It is an important object of this invention to provide a demonstration transparent internal combustion engine which actually burns fuel yet enables all operative parts to be viewed and inspected during operation.

It is another object of the invention to achieve the preceding object while negligibly polluting the air so that the engine may be operated indoors.

It is still a further object of the invention to achieve one or more of the preceding objects while maintaining the transparent walls clear during operation.

It is still another object of the invention to achieve one or more of the preceding objects while having the engine operate slow enough so that its operation may be easily observed.

It is still another object of the invention to achieve one or more of the preceding objects with safety.

It is still another object of the invention to achieve one or more of the preceding objects with an engine capable of burning a variety of inexpensive fuels.

It is still another object of the invention to achieve one or more of the preceding objects with apparatus that is relatively easy and inexpensive to fabricate.

It is still a further object of the invention to achieve one or more of the preceding objects with apparatus capable of operating for relatively long periods of time.

SUMMARY OF THE INVENTION

According to the invention, an internal combustion engine includes piston means and means defining a cylinder wall surrounding the piston means made of transparent material so that operation of the piston, valves and spark gap may be visually observed as the engine operates. Means are provided for coacting with the piston and the cylinder wall to seal the combustion chamber without oil. According to one aspect of the invention this is accomplished with at least one set of rings made of material having a low coefficient of friction, such as Teflon attached to the piston and sealing the region between the piston and the cylinder wall, there being means for supporting the piston to permit relative axial displacement with the cylinder wall while being radially spaced from the cylinder wall in noncontacting relationship. The preferred and alternate piston seal comprises at least one split piston ring of high temperature elastomeric seated in an annular groove in the piston to keep friction low while the rings have enough resiliency to force them against the cylinder wall and keep the combustion chamber sealed. The piston may be metal. According to another aspect of the invention, the piston is fabricated from high temperature material, which may be plastic such as Teflon or tetrafluoroethylene and having an annular groove formed in its upper face near the periphery of the piston to define a somewhat flexible circumferentially continuous flap which bears against the inner surface of the cylinder wall to seal the region between the piston and the cylinder wall. The annular groove formed in the upper face near the periphery of the piston preferably accommodate a thin flexible leaf spring for augmenting the pressure force that helps the flap seal the combustion chamber on the suction stroke. Increasing pressure inside the combustion chamber urges the flap toward the cylinder wall.

According to another feature of the invention, the flywheel is quite massive relative to the cylinder and piston to help establish continuous operation at low speeds, thereby allowing operation of the engine to be inspected visually.

According to still another feature of the invention, the engine may burn low carbon fuel, such as alcohol, so that the transparent portions remain clean to permit visual observation and the engine exhaust negligibly pollutes the air, thereby allowing operation of the invention indoors.

Preferably the cylinder comprises a high temperature glass composition coated with a thin film of high temperature plastic, such as fluoroethylene polymer for absorbing energy and confining fragments should accidental damage occur to this cylinder.

An important feature of the piston and cylinder seal combination according to the invention is that the piston does not contact the cylinder wall. The circumferential means near the top of the piston, such as the flap or rings, functions both to provide bearing surface between the piston and cylinder wall and effect a seal in contrast with customary engine construction where the piston and cylinder wall are essentially in contact over their common length, providing a larger area for wear and normally requiring a fluid lubricating system.

Numerous other features, objects and advantages of the invention will become apparent from the following specification when read in connection with the accompanying drawing in which:

BRIEF DESCRIPTION OF THE DRAWING

FIG. 4 is a rear view of this embodiment; and

FIG. 5 is a view of the modification of the embodiment of FIGS. 1 and 2 illustrating the details of the piston rings that both effect the seal and provide the bearing surface.

DETAILED DESCRIPTION OF PREFERRED EMBODIMENTS

Figure 1:
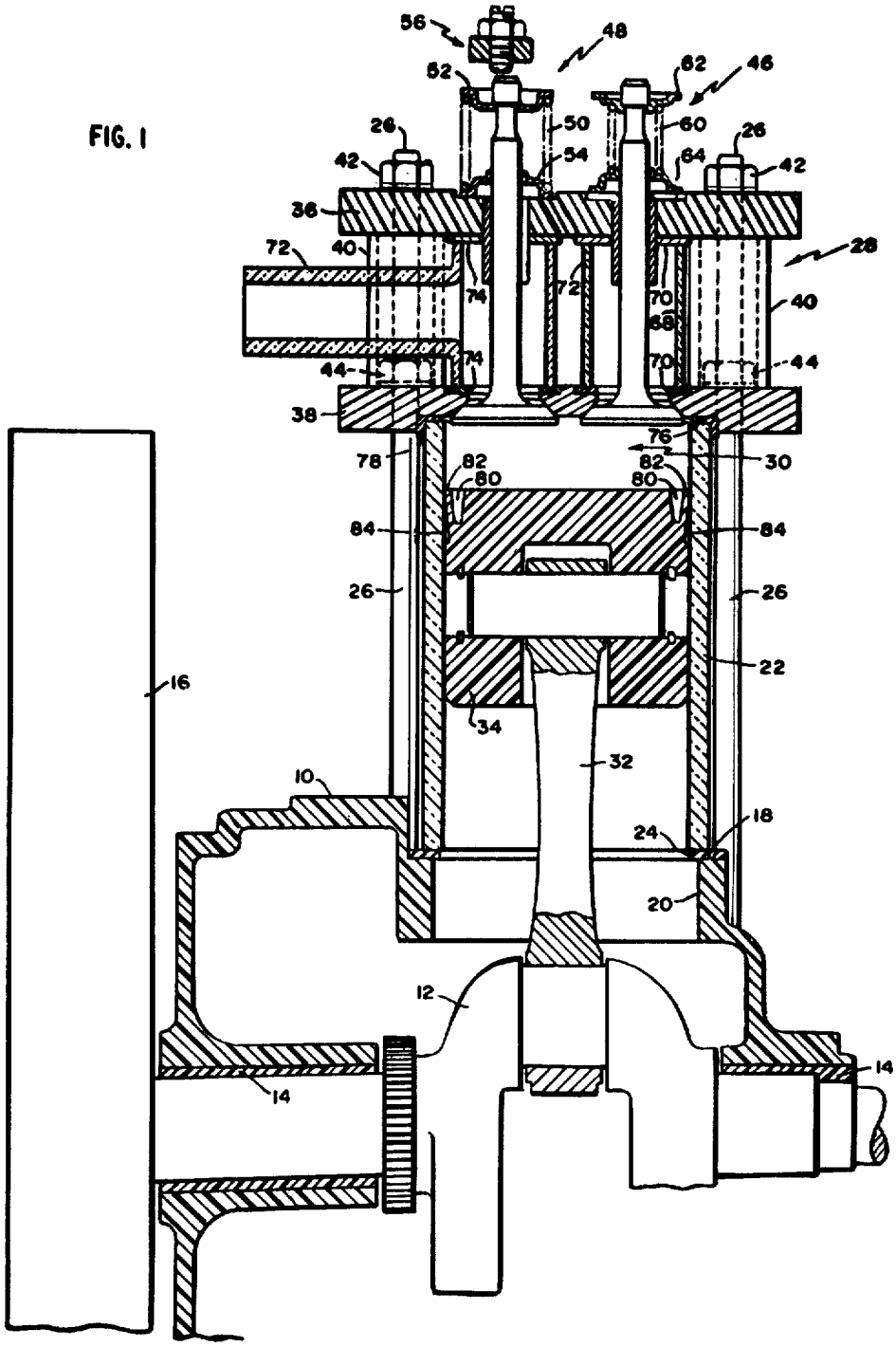
FIG. 1 is a sectional view along section 1—1 of FIG. 2 illustrating an exemplary embodiment of the engine according to the invention.
Figure 2:
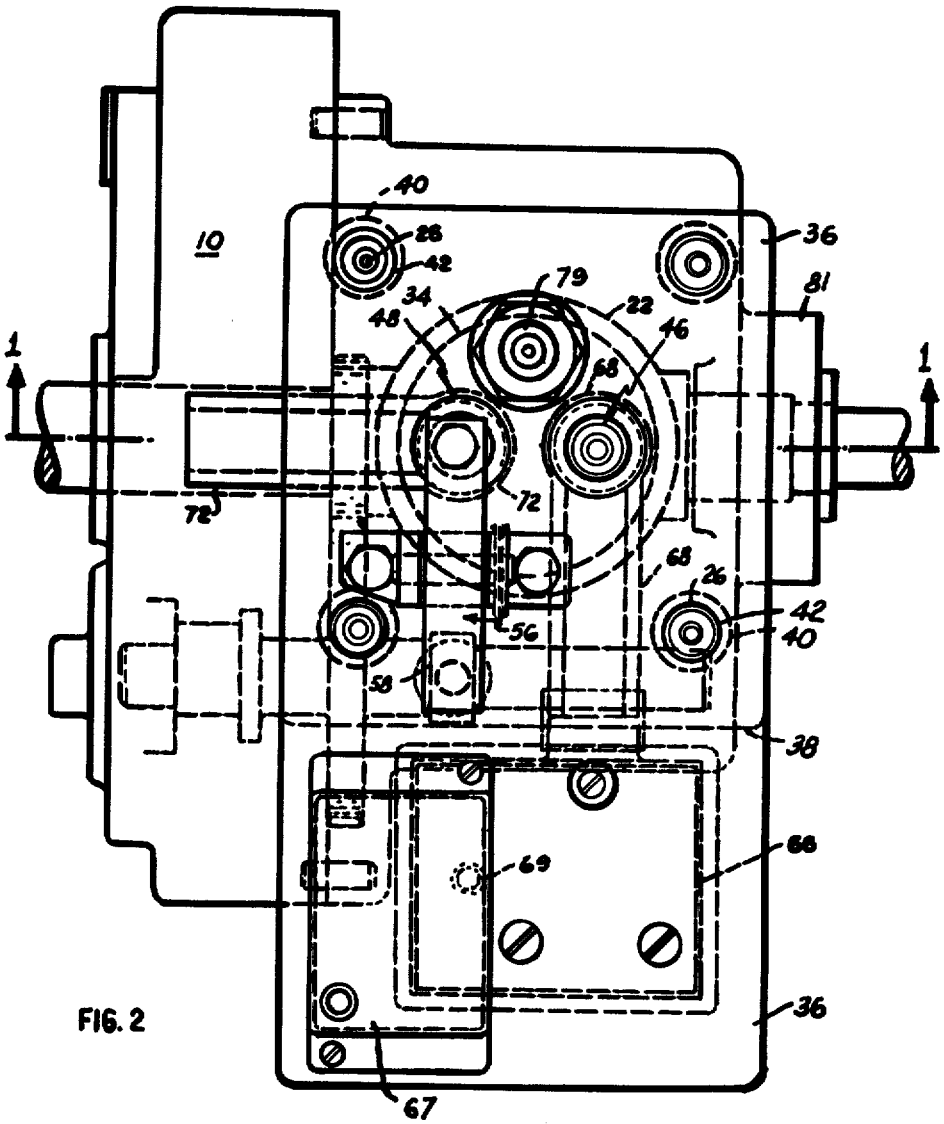
FIG. 2 is a plan view of this embodiment of the engine.

With reference now to the drawing and more particularly FIGS. 1 and 2 thereof, there is shown an embodiment of a transparent internal combustion engine according to the invention. FIG. 1 is a sectional view through section 1—1 of the engine shown in plan view in FIG. 2. This embodiment of the invention includes all the essential elements of a four-cycle internal combustion engine. The internal moving parts of the engine comprise conventional materials ordinarily used in constructing engines. The various housings, such as the cylinder, the intake and exhaust manifolds, the distributor housing, the carburetor housing and certain areas of the crankcase comprise transparent materials, such as an appropriate plastic or glass, or combinations thereof, to expose the internal moving parts to view. Since internal combustion engines are well known in the art, the detailed description which follows will, to the extent practical, omit mention of details well-known in the art so as to avoid obscuring principles of the invention. Throughout the drawing the same reference symbols designate corresponding elements.

The engine includes an internal crankcase and engine block 10 in which the crankshaft 12 is journaled. Metallic bearings 14 may be provided to support the crankshaft 12. An enlarged flywheel 16 is connected to the outwardly projecting end of the crankshaft 12, the flywheel 16 being of a mass which is substantially greater than would normally be required in an operative one-cylinder engine so that the engine may be operated steadily at low speeds to permit visual observation of the internal combustion process.

A shoulder 18 is formed about an opening 20 in the crankcase 10 and receives the cylinder 22. The cylinder 22 is sealed resiliently to the crankcase 10 by resilient gasket 24 which permits limited expansion and contraction of the cylinder 22 with respect to the crankcase 10 to preclude undue stressing of these parts during operation. The cylinder 22 is fastened securely to the crankcase 10 by a number of bolts 26 which pass downwardly through the cylinder head 28, about the cylinder 22 and which are screwed into the crankcase 10. The cylinder 22 is fabricated from any one of a number of commercially available high temperature glass compositions which can withstand the temperatures and pressures generated with the combustion chamber 30. The engine also includes a piston rod 32 and piston 34 which are connected in the usual manner.

The cylinder head 28 includes an upper head plate 36 and a lower head plate 38 which are formed from brass or aluminum. The upper and lower plates 36 and 38 are separated and spaced vertically by spacer bushings 40 which also receive the bolts 26. The cylinder 22 and upper and lower head plates 36, 38 are secured together and to the crankcase 10 by upper and lower nuts 42, 44 which are threaded about their respective bolts and bear downwardly against the upper and lower head plates 36, 38 respectively.

The head 28 includes overhead intake and exhaust valves 46, 48 which extend downwardly through the head plates 36, 38 and seat at the underside of the lower head plate 38. The exhaust valve 48 is biased in a normally closed position by a spring 50 and keepers 52, 54. The exhaust valve is operated by the exhaust cam 58 (see FIG. 2). The inlet valve 46 also is biased in a normally closed configuration by a relatively small spring 60 and its associated keepers 62, 64. The intake spring 60 is designed so that it will maintain the intake valve in a normally closed position but will open in response to the reduced pressure in the combustion chamber 30 as the piston 34 travels downwardly to begin the intake stroke. The intake valve could also be cam operated.

As shown also in FIG. 2, the carburetor 66 is mounted beneath an extension of the upper head plate 36. Fuel is stored in the fuel tank 67 which is mounted on top of the upper head plate 36. Fuel flows from the tank 67 to the carburetor through the conduit 69. The fuel-air mixture is directed to the inlet port by a T-shaped manifold 68 which has a vertically disposed portion surrounding the intake valve 46 between the upper and lower head plates 36, 38. The ends of the vertical portion of the inlet manifold 68 are sealed to the upper and lower head plates 36, 38 by resilient gaskets 70. The manifold 68 also is formed from transparent glass to permit the action of the valve within to be reviewed during operation.

The exhaust valve 48 has a similar T-shaped exhaust manifold 72 which is retained between the upper and lower head plates 36, 38 in surrounding relation to the exhaust valve stem. The exhaust manifold 72 similarly is sealed between the upper and lower head plates 36, 38 by resilient gaskets 74.

The upper end of the cylinder 22 fits somewhat loosely within a shoulder 76 formed within the underside of the lower head plate 38. A resilient gasket 78 is disposed between the mating ends of the cylinder 22 and lower head plate 38 to permit limited flexure therebetween as a result of any expansion or contraction of these parts during operation. The engine also includes a spark plug 79 and magneto or distributor 81 which function in the usual manner.

An important aspect of the invention resides in the construction of the piston 34 to effect a seal between the piston and the inner surface of the cylinder to enable spring engine operation and permit observation of the piston and combustion chamber without scratching or scoring the inner cylinder wall. The piston is thus made of material which if allowed to contact the cylinder wall directly would damage the cylinder wall while the means for effecting a seal between the piston and the inner surface of the cylinder and for radially spacing the piston from the cylinder wall in noncontacting relationship prevent damage to the cylinder wall. The piston 34 is formed from a heat-resistant, flexible material, such as tetrafluoroethylene, or Teflon. The upper surface of the piston 34 is formed to define a somewhat deep annular groove 80 which is exposed to the combustion chamber 30. The groove preferably is tapered, as shown, and defines a relatively thin continuous flap 82 about the upper periphery of the piston 34. The outer surface of the piston is undercut circumferentially, as indicated by the reference character 84 about the region of the flap 82 to provide greater freedom of flexure for the flap 82.

When the engine is operated, the increased pressures which develop within the combustion chamber tend to urge the flap 82 into firm engagement with the inner surface of the cylinder 22, thus effecting the desired seal. The lower circumferential regions of the piston below the undercut portion 84 are cylindrical and mate smoothly with the inner surface of the cylinder 22 to seal the piston from the bottom. By fabricating the cylinder 22 and piston 34 from materials which display a relatively low relative coefficient of friction, the use of piston rings and lubricants are avoided.

In operating the engine it is preferred to employ fuels having a high vapor pressure and relatively broad limits of flammability. For example, acetone, ether, ethyl alcohol and methyl alcohol have been found satisfactory because of their low energy content and also because of the absence of carbon, soot or other noxious or solid material in combustion products. The exhaust is so free of pollutants that the engine may be operated indoors in classrooms. Solid combustion products should preferably be avoided because they might tend to scratch or coat the cylinder wall and reduce its transparent qualities. This is most undesirable in that it would hinder the observation of the internal moving parts for which the device is designed.

Thus, the invention provides an internal combustion engine of transparent construction to permit the operation of its internal parts to be visually inspected while the engine burns fuel in an actual combustion process that emits negligible pollution. Moreover, the invention includes an improved seal between the piston and the transparent cylinder which will not mar the cylinder or otherwise reduce its transparent qualities while sustaining the combustion process.

Figure 3:
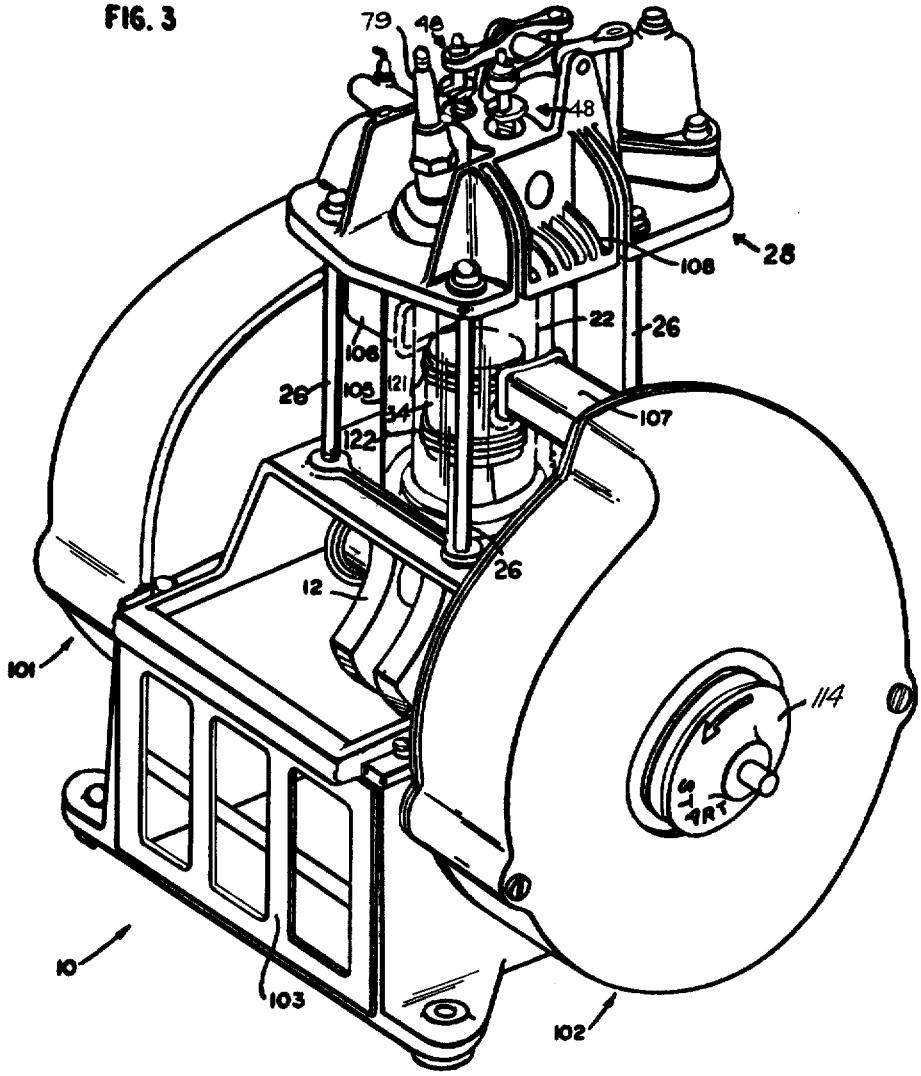
FIG. 3 is a perspective view of a preferred embodiment of the invention having a metal piston.

Referring to FIGS. 3 and 4, there are shown perspective views of a preferred embodiment of the invention. Since this embodiment of the invention is essentially the same as the embodiment described in connection with FIGS. 1 and 2, except for the piston-to-cylinder wall sealing arrangement, the discussion which follows will omit much of the detail set forth above. Referring to FIG. 3, there are shown certain additional features. This embodiment of the invention includes first and second flywheels in flywheel housings 101 and 102, respectively, to facilitate having exceptionally high inertia in a relatively compact structure while further facilitating observing the engine operation. The housing 10 includes a front cover plate 103 having vertical ribs that permits observation of the crankshaft 12 and other internal elements while providing additional protection against fingers getting in. The housing 10 also includes the rear transparent cover plate 104 that facilitates observing operation of the camshaft and valve lifters, as best seen in FIG. 4.

Another feature of this embodiment of the invention is having the cylinder wall 22 inside a strong transparent plastic tube 105 supported between horizontal arms 106 and 107 to further protect against injury should the cylinder wall 22 explode. As indicated above, cylinder wall 22 is preferably coated with a thin plastic layer so that even if it did not explode, the chances of sharp pieces of glass being projected are minimized.

Still another feature of the embodiment of FIGS. 3 and 4 is the provision of cooling fins, such as 108. Such fins may also be located adjacent to the other side of spark plug 79 facing the front.

This embodiment also includes an ignition switch 111, terminals 112 to which a battery is connected and terminals 113 to which a coil is connected. With the battery and coil connected, switch 111 is turned on. A pull rope is then wrapped around pulley 114 attached to the crankshaft and pulled to start the engine. Mixture and fuel controls to control acceleration are conventional and not illustrated here.

An important feature of this embodiment of the invention comprises the piston ring construction in which the piston is made of metal of diameter less than the inside diameter of the cylinder wall, and the sole contact between the cylinder wall and the piston assembly is with the piston rings. Referring to FIG. 5, there is shown a sectional view through piston 34 of FIG. 3 and cylinder wall 22. There are upper and lower pairs of piston rings 121 and 122, respectively. These rings are visible in FIG. 3; however, the relationship of the piston assembly to the cylinder wall is best seen in FIG. 5. Upper piston rings 121 and lower piston rings 122 are made of plastic material having a low coefficient of friction, such as tetrafluoroethylene. The sealing rings, such as rings 121 and 122 are thus made of resilient self-lubricating material having a low coefficient of friction. The piston cylinder 123 may be made of metal and formed with annular recesses at the top and bottom as indicated for accommodating upper ring pair 121 and lower ring pair 122. These recesses also accommodate springs 124 and 125, which may be accordion springs that urge piston rings 121 and 122 firmly against the cylinder wall. A gap between the metal piston 123 and the inside wall of cylinder 22 insures no contact between piston and cylinder wall. As *an* additional feature, to prevent contact between piston and cylinder in case of ring wear or abnormal loading, two non-sealing [brazed] *bumper* rings above and below the sealing rings can be provided in respective annular grooves.

In conventional manner a wrist pin bearing 126 accommodates a wrist pin 127 through which connecting rod 32 is attached to the piston, wrist pin 127 being held in place by retaining ring 128 in a conventional manner.

An important feature of this aspect of the invention is that the piston rings 121 and 122 effect a good seal between the cylinder 123 and cylinder 22 while providing bearing surfaces along which the piston 34 rides. The seal is sufficient so that the combustion chamber above may develop adequate pressure to move piston 34 down after ignition while developing an adequate drop in pressure during the intake stroke to draw an adequate mixture into the combustion chamber. All these results are accomplished while avoiding the liquid lubrication used in conventional internal combustion engines, something that would be especially disadvantageous for the purposes of the invention because the fluid might well obscure or distort the desired view of the operating cycle.

There has been described a novel transparent engine that is especially advantageous in connection with teaching the principles of operation of an internal combustion engine. The relationship between ignition of the spark and piston and valve positions are readily observed. The action of the various valves, shafts, rods and cams are readily observable in relationship to one another to illustrate engine operation.

It is evident that those skilled in the art may now make numerous uses and modifications of and departures from the specific embodiments described herein without departing from the inventive concepts. For example, the invention could be used in engines such as diesels and two-cycle engines or with different valving in external combustion engines such as steam engines. Consequently, the invention is to be construed as embracing each and every novel feature and novel combination of features present in or possessed by the apparatus and techniques herein disclosed and limited solely by the spirit and scope of the appended claims.

What is claimed is:

1. An operative internal combustion engine for displaying the operative relationship among elements thereof comprising, piston means, means defining a cylinder wall surrounding the piston means made of transparent material so that operation of said engine may be visually observed during operation and means coacting with said piston and said cylinder wall for sealing the combustion chamber bounded by means including said cylinder wall and said piston, the latter means also comprising means for establishing a dry lubricating relationship with said cylinder wall as said piston reciprocates therein during engine operation, said engine being free from liquid lubrication inside said cylinder wall, said means for sealing said combustion chamber comprising at least one sealing ring made of resilient self-lubricating material having a low coefficient of friction attached to said piston means and sealing the region between said piston means and said cylinder wall, said engine including first means on said piston means for supporting said piston means to permit relative axial displacement with said cylinder wall and means cooperating with said first means and said piston means for radially spacing said piston from said cylinder wall in noncontracting relationship therewith, said piston means made of material which if allowed to contact the cylinder wall directly would damage said cylinder wall while said sealing ring and said means for radially spacing prevent damage to said cylinder wall.

2. An internal combustion engine in accordance with claim 1 wherein said means for sealing also comprises said said means for radially spacing.

3. Apparatus in accordance with claim 1 wherein said piston means is made of high temperature material and formed with an annular groove formed in its upper face near the periphery of said piston means to define a somewhat flexible circumferentially continuous flap which bears against said cylinder wall to seal the region between said piston means and said cylinder wall, whereby increasing pressure inside the combustion chambers urges said flap toward said cylinder wall.

4. Apparatus in accordance with claim 1 and further comprising, flywheel means having a moment of inertia sufficiently high for slowing the operating rate of said engine to enable visual observation of the operation of the parts thereof.

5. Apparatus in accordance with claim 4 wherein said flywheel means comprises two flywheels on opposite sides of said engine.

6. Apparatus in accordance with claim 1 wherein said means defining a cylinder wall is a high temperature glass composition.

7. Apparatus in accordance with claim [5] *6* wherein said means defining a cylinder wall is coated with plastic material.

8. Apparatus in accordance with claim [5] *6* and further comprising a transparent plastic tube surrounding said means defining a cylinder wall.

9. Apparatus in accordance with claim 3 and further comprising, a circumferential depression undercut about the region of said flap, the bottom circumference of said piston means defining a relatively inflexible portion at the bottom end thereof to seal the lower end of said piston means.

10. Apparatus in accordance with claim 1 wherein the cylinder head of said internal combustion engine comprises a lower plate mounted on said means defining a cylinder wall in sealed relation thereto and formed with valve seats in the underside thereof, a pair of hollow transparent manifolds defining inlet and exhaust passages above said lower plate in registry with respective ones of said valve seats, an upper head plate above said manifolds, a pair of overhead valve means extending through said upper and lower plates and respective ones of said manifolds movable relative thereto for valving cooperation with respective ones of said valve seats and having valve stems projecting beyond said upper plate, and means biasing said valve means in a closed position.

11. Apparatus in accordance with claim [9] *10* and further comprising flexible resilient gasket means disposed between said lower head plate and said means defining a cylinder wall for effecting a seal with limited flexure therebetween.

12. Apparatus in accordance with claim 16 and further comprising, a source of fuel characterized by combustion products substantially free of material that would coat said cylinder wall to reduce the transparency thereof, and means for supplying a mixture of said fuel and air to said combustion chamber.

13. [A method of operating the internal combustion engine of claim 1 which method includes the steps of] *Apparatus in accordance with claim 1 wherein said engine operates by* supplying to said combustion chamber a mixture of ai[d]*r* and fuel characterized by combustion products substantially free of material that would coat said cylinder wall to reduce the transparency thereof, and then igniting said mixture to relatively displace said piston means and cylinder wall while the latter remains transparent.

14. Apparatus in accordance with claim 2 wherein said piston means is formed with an annular groove accommodating said sealing ring and further comprising, spring means inside said annular groove for urging said sealing ring against said cylinder wall.

15. Apparatus in accordance with claim 2 wherein said piston means is formed with first and second spaced annular grooves accommodating first and second pairs of said sealing rings and further comprising spring means inside each of said annular grooves for urging said sealing rings against said cylinder wall.

*16. An operative internal combustion engine comprising,*

*piston means,*

*a crankshaft,*

*a rigid piston rod interconnecting said piston means and said crankshaft,*

*means defining a cylinder wall surrounding the piston means,*

*and means coacting with said piston and said cylinder wall for sealing the combustion chamber bounded by means including said cylinder wall and said piston,*

*the latter means also comprising means for establishing a dry lubricating relationship with said cylinder wall as said piston reciprocates therein during engine operation,*

*said engine being free from liquid lubrication inside said cylinder wall,*

*said means for sealing said combustion chamber comprising at least one resilient sealing ring coacting with dry lubricating material having a low coefficient of friction attached to said piston means and sealing the region between said piston means and said cylinder wall,*

*said engine including first means on said piston means for supporting said piston means to permit relative axial displacement with said cylinder wall and means cooperating with said first means and said piston means for radially spacing said piston from said cylinder wall in noncontracting relationship therewith,*

*said piston means made of material which if allowed to contact the cylinder wall directly would damage said cylinder wall while said sealing ring and said means for radially spacing prevent damage to said cylinder wall.*

*17. An internal combustion engine in accordance with claim 16 wherein said means for sealing also comprises said means for radially spacing.*

*18. Apparatus in accordance with claim 16 wherein said piston means is made of high temperature material and formed with an annular groove formed in its upper face near the periphery of said piston means to define a somewhat flexible circumferentially continuous flap which bears against said cylinder wall to seal the region between said piston means and said cylinder wall,*

*whereby increasing pressure inside the combustion chambers urges said flap toward said cylinder wall.*

*19. Apparatus in accordance with claim 18 and further comprising,*

*a circumferential depression undercut about the region of said flap, the bottom circumference of said piston means defining a relatively inflexible portion at the bottom end thereof to seal the lower end of said piston means.*

*20. Apparatus in accordance with claim 16 and further comprising,*

*a source of fuel characterized by combustion products substantially free of material that would coat said cylinder wall,*

*and means for supplying a mixture of said fuel and air to said combustion chamber.*

*21. Apparatus in accordance with claim 1 wherein said engine operates by supplying to said combustion chamber a mixture of air and fuel characterized by combustion products substantially free of material that would coat said cylinder wall,*

*and then igniting said mixture to relatively displace said piston means and cylinder wall.*

*22. Apparatus in accordance with claim 17 wherein said piston means is formed with an annular groove accommodating said sealing ring and further comprising,*

*spring means inside said annular groove for urging said sealing ring against said cylinder wall.*

*23. Apparatus in accordance with claim 17 wherein said piston means is formed with first and second spaced annular grooves accommodating first and second pairs of said sealing rings and further comprising*

*spring means inside each of said annular grooves for urging said sealing rings against said cylinder wall.*

* * * * *